United States Patent [19]
White et al.

[11] 3,926,994
[45] Dec. 16, 1975

[54] HETEROCYCLIC COMPOUNDS

[75] Inventors: Alan Chapman White, Windsor; Robin Michael Black, Iver Heath, both of England

[73] Assignee: John Wyeth & Brother, Ltd., Taplow, England

[22] Filed: May 23, 1974

[21] Appl. No.: 472,759

Related U.S. Application Data

[63] Continuation-in-part of Ser. No. 309,580, Nov. 24, 1972, abandoned.

[30] Foreign Application Priority Data

May 31, 1973 United Kingdom............... 26079/73

[52] U.S. Cl.... 260/251 R; 260/256.4 C; 260/309.6; 260/239 BC; 424/256
[51] Int. Cl.²................................. C07D 239/00
[58] Field of Search .............................. 260/251 R Primary Examiner—Elbert L. Roberts

[57] ABSTRACT

The disclosure relates to derivatives of tetrahydro-pyrimidine, imidazoline, tetrahydro-1H-1,3-diazepine and hexahydro-1,3-diazocine of the general formula

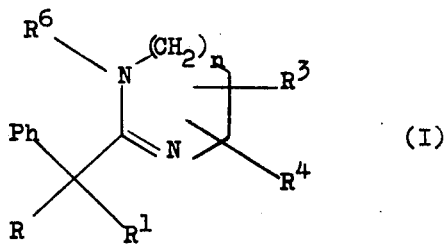

or an acid addition salt thereof wherein n represents 0, 1, 2 or 3, $R^3$ and $R^4$ which may be the same or different represent hydrogen or lower alkyl radicals or $R^3$ represents hydrogen and $R^4$ represents hydroxy, Ph is a phenyl group optionally substituted by one or more hydroxyl, lower alkyl, lower alkoxy, haloloweralkyl, halogen, amino or mono or di(lower)alkylamino groups,, R is a hydroxyl, acyloxy, alkoxy or halo group, $R^1$ is a substituted or unsubstituted phenyl or naphthyl radical and $R^6$ is hydrogen, lower alkyl, or acyl. The compounds have hypoglycemic activity.

5 Claims, No Drawings

HETEROCYCLIC COMPOUNDS

This application is a continuation-in-part of co-pending U.S. Pat. application Ser. No. 309,580 filed Nov. 24, 1972 entitled "Heterocyclic Compounds", now abandoned.

This invention relates to heterocyclic compounds and more particularly to derivatives of tetrahydropyrimidine, imidazoline, tetrahydro-1H-1,3-diazepine and hexahydro-1,3-diazocine, to processes for preparing these coompounds and to pharmaceutical preparations containing them.

The compounds of the present invention are those of general formula

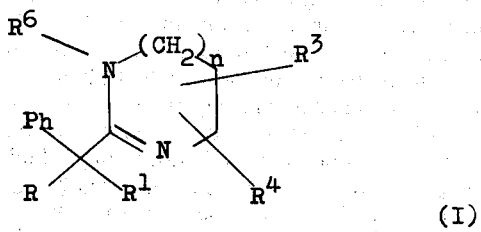

(I)

and their acid addition salts, wherein $n$ represents 0, 1, 2 or 3, $R^3$ and $R^4$ which may be the same or different represent hydrogen or lower alkyl radicals, or $R^3$ represents hydrogen and $R^4$ represents hydroxy, Ph is a phenyl group optionally substituted by one or more hydroxyl, lower alkyl, lower alkoxy, halolower alkyl, halogen, amino or mono or di-(lower)alkylamino groups, R is a hydroxy, acyloxy, alkoxy or halo group, $R^1$ is a substituted or unsubstituted phenyl or naphthyl radical and $R^6$ is hydrogen, lower alkyl or acyl.

Since the compounds of the invention may possess one or more asymmetric carbon atoms, optical enantiomorphs are possible and the compound of the invention may be in the form of the pure enantiomorphs or mixtures of such enantiomorphs, such as racemates.

The term "lower" as used herein means that the radical referred to contains up to 6, preferably up to 4 carbon atoms. It is to be understood that $R^3$ and $R^4$ may be on the same or different carbon atoms, but preferably they are both on the same carbon atom.

In the compounds of formula (I) examples of R groups are hydroxyl; acyloxy groups such as acetoxy, propionoxy, butyryloxy, benzoyloxy, substituted benzoyloxy, phenylacetoxy, methanesulphonyloxy, and p-toluenesulphonyloxy; alkoxy groups such as lower alkoxy groups (e.g. methoxy, ethoxy, n-propoxy, n-butoxy), benzyloxy and phenethoxy; and halo groups such as chloro. Preferably R is hydroxy.

The phenyl or naphthyl group $R^1$ may be substituted or unsubstituted. Suitable substituents are hydroxy, halogen (for example, fluorine, chlorine or bromine), lower alkyl (for example methyl, ethyl, propyl or butyl), lower alkoxy (for example methoxy, ethoxy, propoxy or butoxy) and halolower alkyl (for example, trifluoromethyl), amino or mono or di-(lower)alkyl amino. Preferably $R^1$ is phenyl or halophenyl such as p-chlorophenyl.

Examples of the group Ph are phenyl and phenyl substituted by any of the suitable substituents mentioned above in connection with the group $R^1$. Preferably Ph is phenyl or halophenyl such as o-, m- or p-chloro or bromophenyl.

When the groups $R^3$ and/or $R^4$ are lower alkyl they can be, for example, methyl, ethyl, propyl or butyl.

The group $R^6$ can be hydrogen, a branched or straight chain lower alkyl group (e.g. methyl, ethyl, propyl or butyl) or an acyl group (e.g. formyl, acetyl, propionyl, butyryl, benzoyl, phenylacetyl, benzenesulphonyl or methanesulphonyl). Preferably $R^6$ is hydrogen.

The preferred compounds of general formula (I) are those in which R is hydroxyl, $R^1$ is unsubstituted or substituted phenyl, $R^3$, $R^4$ and $R^6$ are hydrogen and $n$ is 0 or 1.

Particularly preferred compounds of general formula (I) are:
α, α-diphenyl-(1,4,5,6-tetrahydro-2-pyrimidyl)methanol, [4,4(or 5,5)-dimethyl-2-imidozolinyl]-α, α-diphenyl methanol, α-(2,6-dimethylphenyl)-α-phenyl-(1,4,5,6-tetrahydro-2-pyrimidyl)methanol, 2(chlorodiphenylmethyl)-1,4,5,6-tetrahydropyrimidine, α-(m-chlorophenyl)-α-phenyl-(1,4,5,6-tetrahydro-2-pyrimidyl)methanol, α, α-diphenyl-(4,5,6,7-tetrahydro-1H-1,3-diazepin-2lyl)methanol and α, α-diphenyl-(1,4,5,6-tetrahydro-5-hydroxy-2-pyrimidyl) methanol.

The compounds of general formula (I) may be prepared by a process in which a ketone of general formula (II)

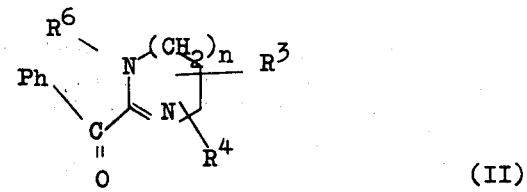

(II)

wherein Ph, $n$, $R^3$, $R^4$ and $R^6$ have the meanings given above, is reacted with an organometallic compound known in the art for the conversion of a ketone function to the

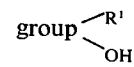

and, if desired one or more of the following optional after-processes are carried out:
a. a compound in which $R^6$ is a hydrogen and/or R is hydroxy is acylated
b. a compound in which R represents a hydroxyl group is converted by a replacement reaction to a compound in which R is halo and, if desired the compound in which R is halo is acylised or reacted with an alkoxide to give a compound in which R is acyloxy or alkoxy
c. a free base of formula (II) is converted into an acid addition salt thereof
d. any group Ph, R, $R^1$, $R^3$, $R^4$ or $R^6$ in a resulting compound is converted into any other Ph, R, $R^1$, $R^3$, $R^4$ or $R^6$ group by known methods.

In the above process the organometallic compound is preferably chosen from (a) Grignard reagents of formula $R^1MgY$ wherein Y is halogen and $R^1$ has the meaning defined above, and (b) alkali-metal compounds such as the lithium derivatives of formula $R^1Li$ for example phenyl lithium). The reaction with the organometallic compound is generally carried out in an inert organic solvent, for example ether or tetrahydrofuran, using the standard conditions known for the particular reaction concerned.

In an alternative method of preparing the compounds of general formula (I) a substituted methane derivative of general formula (III)

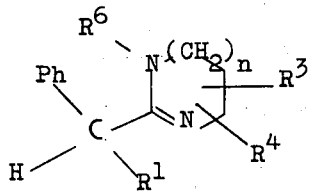

(III)

wherein Ph, n, R$^1$, R$^3$, R$^4$ and R$^6$ have the meanings given above is oxidised to give a compound of general formula (IV)

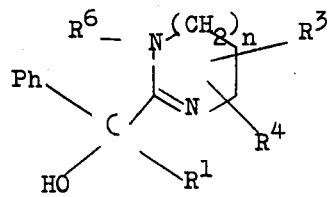

(IV)

and if desired one or more of the optional after-processes described above is carried out. The oxidation may be carried out by standard procedures. For example, oxygen or air may be passed through a solution of the compound of general formula (III) in a solvent (e.g. benzene).

The compounds of general formula (I) may also be prepared in a process in which an acid of general formula (V)

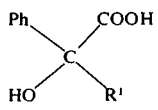

(V)

wherein Ph and R$^1$ have the meanings given above, or a functional derivative thereof such as an ester is condensed with a diamine of general formula (VI)

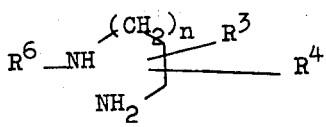

(VI)

wherein n, R$^3$ R$^4$ and R$^6$ have the meanings given above to give a compound of general formula (IV) above and if desired, one or more of the optional after-processes described above is carried out. Preferably the condensation is effected by heating an ester, such as the ethyl ester, of the acid of general formula (V) with the diamine of general formula (VI). The condensation may be carried out in the presence of a cation exchange resin.

As already mentioned, if desired the compound in which R$^6$ represents hydrogen and/or R is a hydroxy group may be acylated. Such an acylation reaction can be carried out by standard methods known in the art. Examples of acylating agents are acid halides (particularly the chlorides) or acid anhydrides of the aliphatic or aromatic carboxylic acids, as well as halides (particularly the chlorides) of some organically substituted inorganic acids such as the aliphatic or aromatic sulphonic acids. If a starting material is used in which R$^6$ is hydrogen and R is hydroxy either a mono or di-acylated product may be obtained. For example depending on the amount of acylating agent used, acetic anhydride in pyridine can give a N-acyl product while acetyl chloride in dichloromethane gives the diacylated product.

Again if desired, the compound in which R represents a hydroxyl group may be converted by a replacement reaction into a compound in which R is halo, particularly chloro. For example, the hydroxy compound can be reacted with a hydrohalic acid or an equivalent halogenating agent known for converting alcohols to halides. In a preferred procedure the hydroxy compound is treated with thionyl chloride. The compound in which R is halo, particularly, chloro may be converted into a compound in which R is alkoxy by reaction with an alkoxide, particularly an alkali metal alkoxide e.g. a sodium alkoxide such as sodium methoxide.

Once a compound of general formula (II) has been prepared any group Ph, R, R$^1$, R$^3$, R$^4$ or R$^6$ may be converted into any other Ph, R, R$^1$, R$^3$, R$^4$ or R$_6$ group by known methods. For example, a phenyl group Ph or R$^1$ may be converted into a halophenyl group by known methods. Furthermore, when Ph or R$^1$ is substituted by a lower alkoxy radical (particularly a methoxy radical), this may be de-etherified by known methods to give the corresponding hydroxyl substituent or conversely when Ph or R$^1$ is substituted by a hydroxyl radical this may be alkylated by known methods to give a lower alkoxy substituent. A hydroxyl function R may be acylated or etherified to form an acyloxy or alkoxy residue R by the methods described hereinbefore. When R$^6$ is a hydrogen atom the compound can be (lower)alkylated to introduce a lower(alkyl) group R$^6$. The compounds in which R$^6$ is lower(alkyl) can also be obtained by reduction, e.g. with a hydride transfer agent such as lithium aluminium hydride of a compound in which R$^6$ is lower acyl. If necessary any reactive group in a compound may be protected by known methods before performing any of the above reactions and then removed by known methods subsequent to the reaction.

The starting compounds of general formula (II), may be prepared by oxidation of the corresponding hydroxy compounds of the general formula (VII)

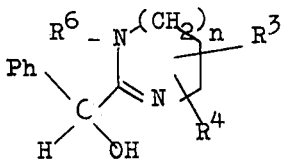

(VII)

wherein Ph, n, R$^3$, R$^4$ and R$^6$ have the meanings given above. Preferably the oxidation is carried out with a mild oxidising agent such as manganese dioxide (for example in a solvent such as dichloromethane, benzene, acetone or aqueous acetone) or lead tetra-acetate (for example in pyridine). It may be desirable to use mild oxidising agents such as precipitated manganese dioxide or precipitated manganese dioxide which has been deactivated (e.g. by stirring with water and then drying).

The compounds of general formula (VII) are described in the literature or may be prepared by known methods, For example, they may be prepared by the methods described by D. G. Neilson et al., J. Chem. Soc. (C), 1968, 1853, N. W. Bristow, J. Chem. Soc. 1957, 513 or C. H. Tilford et al., J. Amer. Chem. Soc., 1949, 71, 1885.

The compounds of formula (I) are capable of forming acid addition salts with acids, particularly pharmaceutically acceptable acids, and the invention also provides such salts. The salts may be isolated directly from the processes described above or prepared by dissolving the specific compound of formula (I) as its base in a suitable organic solvent, and treating it with a solution of the selected acid, in accordance with conventional procedures for preparing acid addition salts from base compounds generally. As examples of acids, there may be used any of hydrochloric, hydrobromic, tartaric, phosphoric, maleic, citric, acetic or benzoic acid.

The optical isomers of the compounds of formula (I) may be prepared by resolving a racemic mixture by standard methods described in the literature. The racemate may be prepared by any of the processes outlined above. It is to be understood that the resolution may be carried out on the racemic mixture of the final desired product, or it may be carried out on a racemate of one compound of general formula (I) and then the optical isomers subjected to after-processes (such as alkylation or acylation) to give the desired product of formula (I).

The compounds of general formula (I) possess pharmacological activity, e.g. hypoglycaemic activity, as shown by standard tests on warm-blooded animals. The compounds can be tested for hypoglycaemic activity by the following procedure:

Male rats weighing 170–200 grams are fasted overnight. A control blood sample is taken from the tail and the sample of test compound is then administered by stomach tube. Subsequent blood samples are taken at hourly intervals for five hours and the change in the blood sugar concentration is determined. In this procedure it was found that many compounds produced a depression in blood sugar of more than 20% for at least 3 of the hourly test samples when administered at 50 mg/kg or less. Examples of such compounds include. $\alpha$, $\alpha$-diphenyl-(1,4,5,6-tetrahydro-2-pyrimidyl)methanol, $\alpha$-m-chlorophenyl)-$\alpha$-phenyl-(1,4,5,6-tetrahydro-2-pyrimidyl)methanol, $\alpha$-(p-chlorphenyl)-$\alpha$-phenyl-(1,4,5,6-tetrahydro-2-pyrimidyl)methanol, [4,4(or5,5)-dimethyl-2-imidazolinyl]$\alpha$, $\alpha$-diphenylmethanol, $\alpha$, $\alpha$-diphenyl-(1,4,5,6-tetrahydro-5,5-dimethyl-2-pyrimidyl)-methanol, $\alpha$, $\alpha$-diphenyl-1-(4,5,6,7-tetrahydro-1H-1,3-diazepin-2-yl)methanol, 2-(chlorodiphenylmethyl)-1,4,5,6-tetrahydropyrimidine, $\alpha$-(m-chlorophenyl)-$\alpha$-phenyl-(4,5,6,7-tetrahydro-1H-1,3-diazepin-2-yl)methanol, 2-chlorodiphenylmethyl)-4,4(or 5,5)-dimethyl-2-imidazoline, 2-(chlorodiphenylmethyl)-4,5,6,7-tetrahydro-1H-1,3-diazepine, 2-[chloro(m-chlorophenyl)-phenylmethyl]-1,4,5,6-tetrahydropyrimidine, 2-[chloro(p-chlorophenyl)-phenylmethyl]-1,4,5,6-tetrahydropyrimidine and 2-(chlorodiphenylmethyl)-1,4,5,6-tetrahydro-5,5-dimethylpyrimidine.

Many of the compounds possess other pharmacological activity e.g. diuretic, anti-inflammatory and cardiovascular activity. For example many of the compounds show antiinflammatory properties when tested by the procedures of Winter et al., in Proc. Soc., Biol. Med., 1962, 111, 544 and Buttle et al in nature, 1957, 179, 629. Some of the compounds of the invention are also $\beta$-adrenoceptor antagonists ($\beta$ blockers). For example, $\alpha$, $\alpha$-diphenyl-(1,4,5,6-tetrahydro-2-pyrimidyl)-methanol induces bradycardia in laboratory animals and antagonises the increase in heart rate induced by isoprenaline without antagonising the peripheral effects. Some of the compounds have been tested for diuretic activity by the following procedure:

Male rats were fasted for 18 hours (overnight) but had free access to drinking water during this time. Next morning the animals' bladders were emptied by gentle squeezing of the lower abdomen and the compounds were then administerd orally as solutions in water. The concentrations of the solutions were adjusted so that each animal received its appropriate dose in a volume equivalent to 25 ml/kg body weight. Pairs of similarly treated animals were placed in metabolism cages (without food or drinking water) and urine was collected for 3 hours. At the end of this period the animals' bladders were emptied as before.

As the compounds of general formula (I) show pharmaceutical activity the invention further provides a pharmaceutical composition which comprises a pharmaceutically active form of a compound provided by the invention in association with a pharmaceutically acceptable carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule or tablet itself, or it can be the appropriate number of any of these in packaged form. The quantity of active ingredient in a unit dose of composition may be varied or adjusted from 5 mg. or less to 500 mg. or more, according to the particular need and the activity of the active ingredient. The invention also includes the compounds in the absence of carrier where the compounds are in unit dosage form.

The following Examples illustrate the invention.

EXAMPLE 1 o-Bromophenyl (1,4,5,6-tetrahydro-2-pyrimidyl)ketone a. A solution of α-(o-bromophenyl)-(1,4,5,6-tetrahydro-2-pyrimidyl)methanol (20 g.) in dichloromethane (1000 ml.) was stirred with precipitated manganese dioxide (150 g.) at room temperature for 48 hours. After filtration, the manganese dioxide was stirred with fresh dichloromethane (400 ml.) for a further hour, filtered, and the combined filtrates dried over magnesium sulphate. Removal of the solvent under reduced pressure and crystallisation of the residue from petroleum (b.p. 60°–80°) yielded the product (12.1 g.) as colourless needles, m.p. 100°–101°. [Found: C, 49.45; H, 4.15; N, 10.45% $C_{11}H_{11}BrN_2O$ requires C, 49.45; H, 4.15; N, 10.5%].

b. A solution of α-(o-bromophenyl)-(1,4,5,6-tetrahydro-2-pyrimidyl)methanol (2.69 g., 0.01 mole) and lead tetraacetate (5.3 g., 0.012 mole) in dry pyridine (40 ml.) was stirred at room temperature for 60 hours. After removal of the pyridine under reduced pressure the residue was diluted with water and extracted with chloroform. The combined extracts were washed with water, dried (MgSO$_4$) and the solvent removed to give a brown residue. Crystallisation from petroleum (b.p. 60°–80°), after treatment with charcoal, yielded the product.

EXAMPLE 2 o-Bromophenyl 4,4(or 5,5)-dimethyl-2-imidazolinyl ketone a. A solution of ethyl o-bromomandelimidate hydrochloride (29.4 g., 0.1 mole) and 1,2-diamino-2-methyl propane (8.8 g., 0.1 mole) in absolute ethanol (150 ml.) was heated under reflux for 5 hours. Removal of the solvent and crystallisation of the residue from isopropanol/ether yielded a crude hydrochloride (23.4 g.). An aqueous solution of the crude hydrochloride was basified (NaOH) with simultaneous scratching of the flask to yield α-(o-bromophenyl)-4,4(or 5,5)-dimethyl-2-imidazolinemethanol as the crystalline free base (16.2 g., m.p. 128°–130°). Alternatively the free base may be extracted into chloroform, the extracts dried (MgSO$_4$), and the residue after removal of the solvent triturated with petroleum (60°–80°).

An analytical sample of the hydrochloride was prepared by acidifying a solution of the free base in isopropanol with ethereal HCl, m.p. 213°–217°; [Found: C, 45.35; H, 5.05; N, 8.6%; $C_{12}H_{15}BrN_2O$. HCl requires C, 45.1, H, 5.05; N, 8.75%].

b. A solution of α-(o-bromophenyl)-4,4(or 5,5)-dimethyl-2-imidazolinemethanol (15.8 g.) in dichloromethane (750 ml.) was stirred with precipitated manganese dioxide (150 g.) at room temperature for 40 hours. The manganese dioxide was filtered and stirred with a further portion of dichloromethane (400 ml.) for 1 hour. After filtering the combined filtrates were dried (MgSO$_4$), the solvent removed and the residue recrystallised from petroleum (b.p. 60°–80°) to yield o-bromophenyl 4,4(or5,5)-dimethyl-2-imidazolinyl ketone (11.01 g., m.p. 107°–108°). [Found: C, 51.25; H, 4.85; N, 10.05%; $C_{12}H_{13}BrN_2O$ requires C, 51.25; H, 4.65; N, 9.95%]. o-Chlorophenyl 4,4(or 5,5)-dimethyl-2-imidazolinyl ketone is prepared in an analogous manner.

EXAMPLE 3 o-Bromophenyl-2-imidazolinyl ketone

A solution of α-(o-bromophenyl)-2-imidazolinemethanol (16.0 g.) in acetone (600 ml.) and water (150 ml.) was stirred with deactivated precipitated manganese dioxide (100 g.) for 24 hours. [The commercial precipitated manganese dioxide was deactivated by stirring with water for 1 hr. and drying in a vacuum oven at ca. 65°–70°C for 5 hours]. After filtering and washing the manganese dioxide with acetone, the solution was evaporated to a small volume under reduced pressure, diluted with water and extracted with chloroform. The combined extracts were dried (MgSO$_4$), the solvent removed and the residue allowed to crystallise from a small volume of ether to yield crude o-bromophenyl 2-imidazolinyl ketone (11.5 g.). A sample recrystallised from benzenepetroleum (b.p. 60°–80°) had m.p. 149°–151°. [Found: C, 47.9; H, 3.7; N, 11.1%; $C_{10}H_9N_2BrO$ requires C, 47.5; H, 3.6; N, 11.1%].

EXAMPLE 4

Phenyl (1,4,5,6-tetrahydro-2-pyrimidyl) ketone a. 1,3-Diaminopropane (14.5., 0.02 mole) was added to a stirred suspension of ethyl mandelimidate hydrochloride (43.2 g., 0.02 mole) in absolute ethanol (200 ml.) and the mixture heated under reflux for 12 hrs. Removal of the solvent under reduced pressure and recrystallisation of the residue from ethanol/ether yielded a crude hydrochloride. The hydrochloride was dissolved in water and basified (NaOH), to yield α-phenyl-(1,4,5,6-tetrahydro-2-pyrimidyl) methanol (25.1 g.) as white crystals, m.p. 171°-173°, [Found: C, 69.05; H, 7.5; N, 14.65%; $C_{11}H_{14}N_2O$ requires C, 69.45; H, 7.4; N, 14.7%].

b. A suspension of α-phenyl-(1,4,5,6-tetrahydro-2-pyrimidyl)methanol (10 g.) in dichloromethane (500 ml.) was stirred at room temperature with precipitated manganese dioxide (100 g.) for 60 hr. The mixture was filtered, the residue washed well with dichloromethane and the combined filtrates dried over magnesium sulphate. Removal of the solvent and crystallisation of the residue from petroleum (b.p. 80°–100°C) yielded the product (6.56 g.) as colourless needles, m.p. 76°–79°. [Found: C, 70.3; H, 6.5; N, 14.9% $C_{11}H_{12}N_2O$ requires C, 70.2; H, 6.4; N, 14.9%].

The following compounds were prepared in an analogous manner by oxidation of respectively [4,4 (or 5,5)-dimethyl-2-imidazolinyl]-phenylmethanol,α-(p-chlorophenyl)-(1,4,5,6-tetrahydro-2-pyrimidyl)methanol and α-(m-chlorophenyl)-(1,4,5,6-tetrahydro-2-pyrimidyl)-methanol with manganese dioxide: 4,4(or 5,5)-dimethyl-2imidazolinyl phenyl ketone, m.p. 80°–82°; p-chlorophenyl (1,4,5,6-tetrahydro-2-pyrimidyl) ketone, m.p. 101°–101° and m-chlorophenyl-(1,4,5,6-tetrahydro-2-pyrimidyl) ketone, m.p. 103°–104°.

EXAMPLE 5

2-Imidazolinyl Phenyl ketone.

A suspension of 2-imidazolinyl-phenylmethanol (5.0 g.) in dichloromethane (250 ml.) was stirred at room temperature with deactivated precipitated manganese dioxide (50 g.) for 60 hrs. The product was isolated as in Example 1 and the residue crystallised from benzene/petroleum to yield the title compound as colourless prisms (3.15 g.), m.p. 141°-143°C. [Found C, 68.9; H, 5.8; N, 16.1% $C_{10}H_{10}N_2O$ requires C, 68.9; H, 5.8; N, 16.05%].

EXAMPLE 6

α,α-Diphenyl-(1,4,5,6-tetrahydro-2-pyrimidyl)methanol

A solution of phenyl (1,4,5,6-tetrahydro-2-pyrimidyl) ketone (3.76 g., 0.02 mole) in dry tetrahydrofuran (25 ml.) was added at room temperature to a stirred solution of phenylmagnesium bromide [made from magnesium (1.2 g., 0.05 mole) and bromobenzene (7.95 g., 0.05 mole] in dry tetrahydrofuran (40 ml.). The mixture was stirred for 14 hrs. at room temperature, poured onto ice/ammonium chloride solution and extracted with chloroform. The combined extracts were washed, dried over magnesium sulphate, the solvent removed and the residue crystallised from isopropanol to yield the product as colourless needles (3.75 g.), m.p. 115°–118°C [Found: C, 76.85; H, 6.8; N, 10.5%; $C_{17}H_{18}N_2O$ requires C, 76.65; H, 6.8; N, 10.5%].

The following compounds were prepared in an analogous manner by reacting respectively phenyl (1,4,5,6-tetrahydro-2-pyrimidyl) ketone with m-chlorophenylmagnesium bromide, phenyl (1,4,5,6-tetrahydro-2-pyrimidyl) ketone with p-chlorophenylmagnesium bromide and p-chlorophenyl-(1,4,5,6-tetrahydro-2-pyrimidyl) ketone with p-chlorophenylmagnesium bromide:

α-(m-chlorophenyl)-α-phenyl-(1,4,5,6-tetrahydro-2-pyrimidyl)methanol hydrochloride, m.p. 191°–193°C; α(p-chlorophenyl)-α-phenyl-(1,4,5,6-tetrahydro-2-pyrimidyl)methanol, hydrochloride, m.p. 187°–189°C; α,α-di-(p-chlorophenyl)-(1,4,5,6-tetrahydro-2-pyrimidyl)methanol, hydrochloride, m.p. 218°–220°C (dec.).

EXAMPLE 7

αα-Diphenyl-(2-imidazolinyl)methanol

A solution of 2-imidazolinyl phenyl ketone (3.48 g., 0.02 mole) in dry tetrahydrofuran (50 ml.) was added at room temperature to a stirred solution of phenylmagnesium bromide [made from magnesium (1.2 g., 0.05 mole) and bromobenzene (7.9 g. 0.05 mole)] in dry tetrahydrofuran (40 ml.). After addition, the mixture was stirred for 14 hrs. at room temperature, poured onto ice/ammonium chloride and extracted with chloroform. The combined extracts were washed, dried over magnesium sulphate and the solvent removed. The residue was dissolved in ethanol, acidified with ethereal HCl and the crude hydrochloride allowed to crystallise. A further crystallisation from ethanol/ether after treatment with charcoal yielded the title compound as pure colourless needles (1.71 g.), m.p. dec>215°C, slightly hygroscopic. [Found: C, 64.5; H, 6.2; N, 9.15%; $C_{16}H_{16}N_2O.HCl.\frac{1}{2}H_2O$ requires C, 64.55; H, 6.1; N, 9.35%].

EXAMPLE 8

α-(m-Chlorophenyl)-[4,4(or 5,5)-dimethyl-2-imidazolinyl]-α-phenylmethanol.

A solution of 4,4(or 5,5)-dimethyl-2-imidazolinyl phenyl ketone (4.04 g., 0.02 mole) in dry tetrahydrofuran (50 ml.) was added at room temperature to a stirred solution of m-chlorophenylmagnesium bromide [made from magnesium (1.2 g., 0.05 mole) and m-bromochlorobenzene (9.5 g., 0.05 mole)] in dry tetrahydrofuran (40 ml.). The mixture was stirred for 14 hrs., poured onto ice/ammonium chloride and extracted with chloroform. The combined extracts were washed, dried over magnesium sulphate, the solvent removed and the residue triturated with petroleum to yield crude white needles. Crystallisation from ethanol/ethereal HCl yielded the title compound as the pure hydrochloride, m.p. 205°–207°C (dec.). [Found: C, 60.4; H, 5.35; N, 8.15%; $C_{18}H_{19}ClN_2O$. HCl requires C, 60.55; H, 5.8; N, 8.3%].

The following compound was prepared in an analogous manner by the reaction of 4,4(or 5,5)-dimethyl-2-imidazolinyl phenyl ketone with phenylmagnesium bromide: α,α-diphenyl[4,4(or 5,5)-dimethyl-2-imidazolinyl]methanol hydrochloride, m.p. 210°–213°C.

EXAMPLE 9

α,α-Diphenyl-(1,4,5,6-tetrahydro-2-pyrimidyl)methanol

A current of dry oxygen was bubbled through a solution of 1, 4, 5, 6-tetrahydro-2-(diphenylmethyl)-pyrimidine (5.0 g.) in dry benzene (250 ml.) at 50°C for 24 hours. Removal of the solvent and crystallisation of the residue from a small volume of isopropanol yielded the title compound (2.3 g.), m.p. 115°–118°C.

EXAMPLE 10

-(4-Methoxyphenyl)-α-phenyl-(1,4,5,6-tetrahydro-2-pyrimidyl) methanol

A solution of phenyl (1,4,5,6-tetrahydro-2-pyrimidyl) ketone (3.0 g., 0.016 mole) in dry tetrahydrofuran (25 ml.) was added at room temperature to a stirred solution of 4-methoxyphenylmagnesium bromide [made from magnesium (0.96 g., 0.04 mole) and p- bromoanisole (7.5 g., 0.04 mole] in dry tetrahydrofuran (25 ml.). After stirring overnight at room temperature the solution was poured onto ice/ammonium chloride solution, extracted with chloroform, and the combined extracts dried (MgSO$_4$). After removal of the solvent the residue was taken up in benzene, extracted with 2N HCl, the extracts basified (NH$_4$OH) and extracted with chloroform. Removal of the solvent from the dried extracts and crystallisation of the residue from isopropanol yielded the product, (1.47 g., m.p. 114°–116°C). [Found: C, 72.7; H, 6.9; N, 9.2%; C$_{18}$H$_{20}$N$_2$O$_2$ requires C, 72.95; H, 6.8; N, 9.45%].

EXAMPLE 11

α-(2,6-Dimethylphenyl)-α-phenyl-(1,4,5,6-tetrahydro-2-pyrimidyl)methanol

Phenyl (1,4,5,6-tetrahydro-2-pyrimidyl)ketone (3.76 g., 0.02 mole) in dry tetrahydrofuran (25 ml.) was added to a stirred solution of 2,6-dimethylphenylmagnesium bromide [made from magnesium (2.55 g., 0.11 mole), 2,6-dimethylbromobenzene (9.25 g., 0.05 mole) and ethylene dibromide (9.4 g., 0.05 mole) using a constant entrainment process] in dry tetrahydrofuran (50 ml.). Following the procedure outlined in Example 10 above, the free base was crystallised from a small volume of isopropanol (2.7 g., m.p. 106°–7°C). After recrystallisation from isopropanol the colourless needles had m.p. 110°–111°C. [Found: C, 77.6; H, 7.6; N, 9.4%; C$_{19}$H$_{22}$N$_2$O requires C, 77.5; H, 7.5; N, 9.5%].

EXAMPLE 12

α-(1-Naphthyl)-1-phenyl-(1,4,5,6-tetrahydro-2-pyrimidyl)methanol hydrochloride

A solution of phenyl (1,4,5,6-tetrahydro-2-pyrimidyl) ketone (3.0 g., 0.016 mole) in dry tetrahydrofuran (25 ml.) was added at room temperature to a stirred solution of 1-naphthylmagnesium bromide [made from magnesium (0.96 g., 0.04 mole) and 1-bromonaphthalene (8.3 g., 0.04 mole)] in dry tetrahydrofuran (e.g. 30 ml.). After stirring overnight the solution was poured onto ice/ammonium chloride solution, extracted with chloroform and the combined extracts dried (MgSO$_4$). Removal of the solvent and crystallisation of the residue from a small volume of isopropanol yielded the free base (2.6 g., m.p. 131°–2°C). The solvated hydrochloride crystallised from ethereal HCl/ethanol, m.p. 172°–7°. [Found: C, 69.2; H, 6.7; N, 6.8%, C$_{21}$H$_{20}$N$_2$O.HCl.C$_2$H$_5$OH requires C, 69.4; H, 6.6; N, 7.0%].

EXAMPLE 13

α-(o-Bromophenyl)-α-(m-chlorophenyl)-1,4,5,6-tetrahydro-2-pyrimidyl)methanol hydrobromide.

o-Bromophenyl (1,4,5,6-tetrahydro-2-pyrimidyl) ketone (2.67 g., 0.01 mole) in dry tetrahydrofuran (15 ml.) was added to a stirred solution of m-chlorophenylmagnesium bromide [made from magnesium (0.6g., 0.025 mole, and m-bromochlorobenzene (4.8 g., 0.025 mole)] in dry tetrahydrofuran (25 ml.). The solution was stirred overnight at room temperature and the product isolated as in Example 12. The free base (2.71 g., m.p. 153°–154°C) crystallised from the crude product on trituration with isopropanol.

The hydrobromide was crystallised from isopropanol/ether, m.p. 220°–223°C. [Found: C, 44.7; H, 3.85; N, 6.1%]C$_{17}$H$_{16}$BrClN$_2$O. HBr requires C, 44.35; H, 3.7; N, 6.1%].

EXAMPLE 14

α,α-Diphenyl-(1,4,5,6-tetrahydro-1-methyl-2-pyrimidyl) methanol hydrobromide

A solution of α-phenyl (1,4,5,6-tetrahydro-1-methyl-2-pyrimidyl)methanol (10 g.) in dry benzene (500 ml.) was stirred with active manganese dioxide (120 g.) [prepared according to Attenburrow et al. J. Chem. Soc. 1952, 1094] at room temperature for 24 hrs. Filtration through Kieselguhr and removal of the benzene at ca. 30°C gave (1,4,5,6-tetrahydro-1-methyl-2-pyrimidyl)phenyl ketone as a crude oil (8.13 g.). The rather unstable ketone was used immediately in the next stage.

A solution of the crude ketone (6.06 g., 0.03 mole) in dry tetrahydrofuran (10 ml.) was added dropwise to a stirred solution of phenylmagnesium bromide [made from magnesium (1.8 g., 0.075 mole) and bromobenzene (11.8 g., 0.075 mole)] in dry tetrahydrofuran (60 ml.) at 0°C. The solution was stirred overnight at room temperature, poured onto ice/ammonium chloride solution, extracted with chloroform and the combined extracts washed and dried (MgSO$_4$). After removal of the solvent the residue was dissolved in isopropanol, neutralised with concentrated hydrobromic acid and the water azeotroped off with isopropanol under reduced pressure. The residue crystallised from isopropanol to give colourless needles, (3.21 g., m.p. 172°–174°C). [Found: C, 60.1; H, 6.05; N, 7.6%; C$_{18}$H$_{20}$N$_2$O.HBr requires C, 59.85; H, 5.85; N, 7.75%].

EXAMPLE 15

α,α-Diphenyl-(4,5,6,7-tetrahydro-1H-1,3-diazepin-2-yl)-methanol

A solution of α-phenyl-(4,5,6,7-tetrahydro-1H-1,3-diazepin-2-yl)-methanol (10 g.) in dry benzene (500 ml.) was stirred with active manganese dioxide (prepared as an Example 14) (120 g.) at room temperature for 24 hours. Filtration and removal of the solvent yielded phenyl (4,5,6,7-tetrahydro-1H-1,3-diazepin-2-yl) ketone as a crude unstable oil (6.31 g.).

A solution of the crude ketone (4.04 g., 0.02 mole) in dry tetrahydrofuran (25 ml.) was added to a stirred solution of phenylmagnesium bromide [made from magnesium (1.2 g., 0.05 mole) and bromobenzene (7.9 g., 0.05 mole)] in dry tetrahydrofuran (ca. 40 ml.) at 0°C. After stirring overnight at room temperature the reaction mixture was worked up as in Example 10. Crystallisation of the crude residue from a small volume of isopropanol yielded the title compound (1.83 g. m.p. 119°–121°C). [Found; C, 77.1; H, 7.2; N, 10.0%. C$_{18}$H$_{20}$N$_2$O requires C, 77.1; H, 7.2; N, 10.0%].

EXAMPLE 16

Phenyl (1,4,5,6-tetrahydro-5,5-dimethyl-2-pyrimidyl) ketone

A solution of phenyl-(1,4,5,6-tetrahydro-5,5-dimethyl-2-pyrimidyl) methanol (9.2 g.) [prepared from ethyl mandelimidate hydrochloride and 1,3-diamino-2,2-dimethylpropane] in dichloromethane (450 ml.) was stirred with commercial precipitated manganese dioxide (92 g.) for 60 hrs. at room temperature. The mixture was filtered and the manganese dioxide stirred with a further portion of dichloromethane (200 ml.) for 1 hour. After filtering, the combined filtrates were dried (MgSO$_4$), the solvent removed and the residue crystallised from petroleum (b.p. 60°–80°C) to give colourless needles (7.39 g., m.p. 131°–133°C) [Found: C, 72.05; H, 7.35; N, 12.85%. C$_{13}$H$_{16}$N$_2$O requires C, 72.2; H, 7.45; N, 12.95%].

EXAMPLE 17

α,α-Diphenyl-(1,4,5,6-tetrahydro-5,5-dimethyl-2-pyrimidyl)-methanol hydrobromide A solution of phenyl-(1,4,5,6-tetrahydro-5,5-dimethyl-2-pyrimidyl) ketone (4.32 g., 0.02 mole) in dry tetrahydrofuran (50 ml.) was added to a stirred solution of phenylmagnesium bromide (0.05 mole) in dry tetrahydrofuran (50 ml.) at 0°C. After stirring overnight at room temperature the reaction was worked up as in Example 12. The crude product crystallized from isopropanol to give the free base of the title compound (3.79 g., m.p. 136°–138°C).

A solution of the free base in isopropanol was made just acid with concentrated hydrobromic acid, the isopropanol and water removed under reduced pressure, and the residue allowed to crystallise slowly from acetone to yield the title compound (m.p. 217°–218°C). [Found: C, 60.9; H, 6.3; N, 7.15% C$_{19}$H$_{22}$N$_2$O.HBr requires C, 60.8; H, 6.2; N, 7.45%].

EXAMPLE 18

Phenyl (1,4,5,6-tetrahydro-5-hydroxy-2-pyrimidyl) ketone hydrochloride a. 1,3-Diamino-2-hydroxypropane (9.0 g., 0.1 mole) in absolute ethanol (20 ml.) was added dropwise to a stirred suspension of ethyl mandelimidate hydrochloride (21.6 g., 0.1 mole) in absolute ethanol (100 ml.) at 0°C. After stirring for 1 hr. at 0°, the solution was heated under reflux for 16 hrs., and the solvent evaporated to about half volume. Sodium ethoxide solution (0.1 mole) was added and after standing for 30 mins. the mixture was filtered. Removal of the solvent and crystallisation of the residue from isopropanol/ethyl methyl ketone yielded α-phenyl-(1,4,5,6-tetrahydro-5-hydroxy-2-pyrimidyl)methanol. (15.67 g., m.p. 150°–152°C). [Found: C, 64.3; H, 7.0; N, 13.5% C$_{11}$H$_{14}$N$_2$O$_2$ requires C, 64.1, H, 6.8; N, 13.6%].

b. A finely ground suspension of α-phenyl-(1,4,5,6-tetrahydro-5-hydroxy-2-pyrimidyl)-methanol (7.7 g.) in dichloromethane (400 ml.) was stirred with commercial precipitated manganese dioxide (77 g.) for 4 days at room temperature. After filtering, the manganese dioxide was stirred for a further hour with dichloromethane (250 ml.), and the mixture filtered. The combined filtrates were evaporated under reduced pressure and the residue triturated with a little ethyl methyl ketone to yield the crystalline ketone (5.05 g.). The hydrochloride crystallised readily from ethereal HCl/isopropanol, (dec. >215°C). [Found: C, 54.8; H, 5.55; N, 11.7% C$_{11}$H$_{12}$N$_2$O$_2$.HCl requires C, 54.8; H, 5.45; N, 11.6%].

EXAMPLE 19

α,α-Diphenyl-(1,4,5,6-tetrahydro-5-hydroxy-2-pyrimidyl)methanol hydrobromide

A solution of phenyl (1,4,5,6-tetrahydro-5-hydroxy-2-pyrimidyl) ketone (4.08., 0.02 mole) in dry tetrahydrofuran (100 ml.) was added to a stirred solution of phenylmagnesium bromide (0.07 mole) in dry tetrahydrofuran (ca. 50 ml.) and the mixture heated under reflux for one hour. After stirring overnight at room temperature the mixture was poured onto a small quantity of ice and ammonium bromide (6.86 g.) solution, and extracted three times with tetrahydrofuran (ca. 700 ml.). The combined extracts were evaporated under reduced pressure, and the residual water azeotroped off with isopropanol. The residue crystallised slowly from isopropanol to give the solvated hydrobromide as colourless needles (1.67 g.). After recrystallisation from isopropanol the crystals had m.p. 195°–198° (dec.). [Found: C, 56.8; H, 5.8; N, 7.2%. C$_{17}$H$_{18}$N$_2$O$_2$.HBr.1/2 C$_3$H$_8$O requires C, 56.5; H, 5.85; N, 7.1%].

EXAMPLE 20

2-(Chlorodiphenylmethyl)-1,4,5,6-tetrahydro-pyrimidine hydrochloride

Thionyl chloride (11.0 ml., 0.15 mole) was added dropwise to a stirred cooled (ice bath) solution of α,α-diphenyl-(1,4,5,6-tetrahydro-2-pyrimidyl)-methanol (13.3 g., 0.05 mole) in dry chloroform (100 ml.). The solution was stirred 1 hour at room temperature and then heated under reflux for 4 hours. On dilution with a little ether the title compound (14.35 g., dec > ca. 205°C) crystallised. [Found: C, 63.6; H, 5.7; N, 8.5%; C$_{17}$H$_{17}$ClN$_2$.HCl requires C, 63.6; H, 5.65; N, 8.7%].

EXAMPLE 21

2-(Methoxydiphenylmethyl)-1,4,5,6-tetrahydro-pyrimidine hydrochloride

A solution of 2-(chlorodiphenylmethyl)-1,4,5,6-tetrahydro-pyrimidine hydrochloride (0.8 g., 0.025 mole) and sodium methoxide (0.005 mole) in dry methanol (25 ml.) was left at room temperature over a weekend. After removal of the solvent, the residue was dissolved in chloroform, washed with water and dried (MgSO$_4$). Removal of the solvent and trituration of the residue with petroleum (b.p. 60°–80°C) gave the crude base (0.675 g.). The slightly hygroscopic hydrochloride crystallised from ethereal HCl/ethanol, m.p. 270°–271°C (dec.). [Found: C, 67.95; H, 6.95; N, 8.55% C$_{18}$H$_{20}$N$_2$O.HCl requires C, 68.25, H, 6.7; N, 8.8%].

EXAMPLE 22

2-(Chlorodiphenylmethyl)-4,4(or 5,5)-dimethyl-2-imidazoline hydrochloride

Thionyl chloride (1.1 ml., 0.015 mole) was added dropwise to a stirred solution of [4,4(or 5,5)-dimethyl-2-imidazoline]diphenylmethanol (1.4 g., 0.005 mole) in dry chloroform. Following the procedure outlined in Example 20 the slightly hygroscopic title compound was obtained, (1.6 g., m.p. 196°–200°C). [Found: C, 62.7; H, 5.9; N, 8.15%; C$_{18}$H$_{19}$ClN$_2$.HCl.1/2H$_2$O requires C, 62.8; H, 6.15; N, 8.15%].

EXAMPLE 23

α-Chlorophenyl 2-imidazolinyl ketone

A solution of o-chlorophenyl-2-imidazolinemethanol (22 g.) in acetone (980 ml.) and water (220 ml.) was stirred for 24 hrs. at room temperature with manganese dioxide (160 g.) [prepared by treating commercial precipitated manganese dioxide with water and drying in a vacuum oven at 65-70°C for 5 hrs.]. The mixture was filtered, the manganese dioxide washed with acetone and the filtrate concentrated under reduced pressure. After dilution with water, the solution was extracted with chloroform, the combined extracts dried (MgSO$_4$) and the solvent removed. Trituration of the residue with ether yielded the crude ketone (13.9 g.). Crystallisation from benzene after treatment with charcoal yielded an analytical smaple, m.p. 128.5°–130°C, [Found: C, 57.9; H, 4.35; N, 13.7% C$_{10}$H$_9$ClN$_2$O requires C, 57.55; H, 4.35; N, 13.4%].

EXAMPLE 24

(1-Acetyl-1,4,5,6-tetrahydro-2-pyrimidyl)-α,α-diphenylmethanol hydrobromide

A solution of α,α-diphenyl-(1,4,5,6-tetrahydro-2-pyrimidyl)-methanol (1.33 g., 0.005 mole) and acetic anhydride (0.76 g., 0.0075 mole) in dry pyridine (20 ml.) was stirred at room temperature for 24 hrs. After removal of the pyridine, the residue was dissolved in isopropanol, made just acid with concentrated hydrobromic acid, and the isopropanol and water removed under reduced pressure. Crystallisation of the residue from isopropanol/ether yielded the product (1.07 g., m.p. 198°–200° (dec.). [Found: C, 58.45; H, 5.6; N, 7.15%; C$_{19}$N$_{20}$N$_2$O$_2$.HBr requires C, 58.6; H, 5.45; N, 7.2%].

EXAMPLE 25

(1-Acetyl-1,4,5,6-tetrahydro-2-pyrimidyl)-diphenylmethyl acetate hydrochloride

Acetyl chloride (0.6 g., 0.0075 mole) in dry dichloromethane (3 ml.) was added dropwise to a stirred solution of (1,4,5,6-tetrahydro-2-pyrimidyl)diphenylmethanol (0.665 g., 0.0025 mole) and triethylamine (0.76 g., 0.0075 mole) in dry dichloromethane (15 ml.) at 0°C. After stirring for 1½ hrs. at 0°C, the mixture was diluted with dichloromethane (20 ml.), washed with two portions of water (20 ml.) and dried (MgSO$_4$). Removal of the dichloromethane and crystallisation of the residue from isopropanol yielded colourless needles of (1-acetyl-1,4,5,6-tetrahydro-2-pyrimidyl)-diphenylmethyl acetate (0.495 g., m.p. 148°–149°C).

The hydrochloride crystallised from methanol/ether m.p. 137°–138°C. [Found: C, 65.15; H, 6.05; N, 7.15%. C$_{21}$H$_{22}$N$_2$O$_3$HCl requires C, 65.2; H, 6.0; N, 7.25%].

EXAMPLE 26

α-(m-Chlorophenyl)-α-phenyl-(4,5,6,7-tetrahydro-1H-1,3-diazepin-2-yl)methanol

A solution of crude (4,5,6,7-tetrahydro-1H-1,3-diazepin-2-yl)phenyl ketone (4.7g.) in dry tetrahydrofuran (40 ml.) was added dropwise to a stirred ice-cooled solution of m-chlorophenylmagnesium bromide (0.075 mole) in dry tetrahydrofuran (60 ml.). After the addition the solution was stirred overnight at room temperature and worked up as in Example 10. Crystallisation of the crude residue from a small volume of isopropanol yielded white needles (1.595 g.). Recrystallisation from isopropanol gave the pure title compound, m.p. 105°–107°C. [Found: C, 68.6; H, 6.2; N, 9.0%. C$_{18}$H$_{19}$ClN$_2$O requires C, 68.65; H, 6.1; N, 8.9%].

EXAMPLE 27

2-(Chlorodiphenylmethyl)-4,5,6,7-tetrahydro-1H-1,3-diazepine hydrochloride

To a stirred solution of 4,5,6,7-tetrahydro-α,α-diphenyl-1H-1,3-diazepine-2-methanol (0.7g., 0.0025 mole) in dry chloroform (10 ml.) was added thionyl chloride (0.55 ml, 0.0075 mole), the solution stirred one hour at room temperature and then heated under reflux for 3½ hours. After removal of the solvent and excess thionyl chloride under reduced pressure, the residue was crystallised as colourless needles (0.581 g.) from ethanol/ether. Recrystallisation from ethanol/ether gave the title compound (0.481 g.), slow dec. on heating, especially above ca. 190°C. [Found: C, 64.8; H, 6.1; N, 8.35% C$_{18}$H$_{19}$N$_2$Cl. HCl requires: C, 64.5; H, 6.0; N, 8.35%]

EXAMPLE 28

2-[Chloro(m-chlorophenyl)phenylmethyl]-1,4,5,6-tetrahydropyrimidine hydrochloride To a stirred solution of α-(m-chlorophenyl)-1,4,5,6-tetrahydro-α-phenyl-2-pyrimidine methanol (0.75g., 0.0025 mole) in dry chloroform (10 ml.) was added thionyl chloride (0.55 ml., 0.0075 mole), the solution stirred 1 hour at room temperature and then heated under reflux for four hours. After removal of the solvent, the residue crystallized upon prolonged trituration with acetone/ether. (0.508g., slow dec.> ca. 200°C). [Found: C, 57.4; H, 4.9; N, 7.85% C$_{17}$H$_{16}$N$_2$Cl$_2$.HCl requires: C, 57.4; H, 4.8; N, 7.9%]

EXAMPLE 29

2-[Chloro (p-chlorophenyl)phenylmethyl]-1,4,5,6-tetrahydropyrimidine hydrochloride To a stirred solution of α-(p-chlorophenyl)-1,4,5,6-tetrahydro-α-phenyl-2-pyrimidine methanol (0.30g.) in dry chloroform (10 ml.) was added thionyl chloride (0.2 ml), the mixture was stirred 1 hour at room temperature and then heated under reflux for 2 hours. After cooling, the white crystalline precipitate was filtered and dried in a vacuum oven to give the title compound (0.321g., slow dec > ca. 200°C) [Found: C, 57.1; H, 4.9; N, 7.7%; C$_{17}$H$_{16}$N$_2$Cl$_2$.HCl requires: C, 57.4; H, 4.8; N, 7.9%]

EXAMPLE 30

2-(Chlorodiphenylmethyl)-1,4,5,6-tetrahydro-5,5-dimethylpyrimidine hydrochloride To a stirred solution of 1,4,5,6-tetrahydro-5,5-dimethyl-α,α-diphenyl-2-pyrimidine methanol (0.735g., 0.0025 mole) in dry chloroform (10 ml.) was added thionyl chloride (0.55 ml., 0.0075 mole). The solution was stirred for 1 hour at room temperature and then heated under reflux for 4 hours after dilution with a little ether, the white crystalline precipitate (0.884 g.) was filtered and recrystallized from ethanol/ether to give the title compound, m.p. 229° to 231°C (dec.) [Found: C, 65.5; H, 6.4; N, 7.75% C$_{19}$H$_{21}$ClN$_2$HCl requires: C, 65.35; H, 6.35; N, 8.0%]

EXAMPLE 31

α-(1,4,5,6,7,8-Hexahydro-1,3-diazocin-2-yl)-α-phenylmethanol

Ethyl mandelimidate hydrochloride (21.6 g., 0.1 mole) was added portionwise to a stirred solution of 1,5-diaminopentane (10.2 g., 0.1 mole) in absolute ethanol (500 ml.) at 0°. After the addition the solution was stirred for 1 hour at 0° and for a further hour at room temperature. The solution was then heated under reflux for 24 hrs. After removal of the solvent the residual oil was dissolved in 1N hydrochloric acid, extracted with ether and then basified with 10N sodium hydroxide solution. The solution was extracted several times with dichloromethane, the combined extracts dried (MgSO$_4$) and the solvent removed to yield a brown oil. Slow crystallisation from a small volume of ethyl methyl ketone yielded the title compound as white crystals (2.17 g., m.p. 142°–146° [slow dec.]). [Found: C, 71.8; H, 8.3; N, 12.8%; C$_{13}$H$_{18}$N$_2$O requires C, 71.5; H, 8.3; N, 12.8%].

The title compound was converted into its hydrochloride salt, m.p. 250°–255° (dec), [Found: C, 61.2; H, 7.5; N, 11.15%; C$_{13}$H$_{18}$N$_2$O.HCl requires C, 61.3; H, 7.5; N, 11.0%].

EXAMPLE 32

(1,4,5,6,7,8-Hexahydro-1,3-diazocin-2-yl) phenyl ketone

A suspension of α-(1,4,5,6,7,8-hexahydro-1,3-diazocin-2-yl)-α-phenylmethanol (2.9 g.) in dichloromethane (150 ml.) was stirred with active manganese dioxide (30 g.) for 48 hrs. After filtering through kieselguhr the solvent was removed and the residue crystallised from light petroleum (b.p. 60°–80°) to give the title compound as crude needles (1.4 g.). Recrystallisation from light petroleum gave the pure product, m.p. 70°–71°; [Found: C, 72.3; H, 7.45; N, 12.7%. C$_{13}$H$_{16}$N$_2$O requires: C, 72.2; H, 7.45; N, 12.95%].

EXAMPLE 33

α-(1,4,5,6,7,8-Hexahydro-1,3-diazocin-2-yl)-α,α-diphenylmethanol

A solution of crude (1,4,5,6,7,8-hexahydro-1,3-diazocin-2-yl) phenyl ketone (1.4 g.) in dry tetrahydrofuran (20 ml.) was added dropwise to a stirred solution of phenylmagnesium bromide (0.02 mole) in dry tetrahydrofuran (30 ml.) at 0°. The solution was stirred overnight at room temperature, poured onto ice/ammonium chloride solution, extracted with chloroform and the combined extracts washed and dried (MgSO$_4$). Removal of the solvent and crystallisation of the residue from isopropanol yielded colourless crystals (0.761 g.). The mother liquors were evaporated, the residue dissolved in benzene and extracted with 2N HCl. After basification the solution was worked up as above to give a further 0.302 g. Recrystallisation from isopropanol gave the title compound as a pure product (m.p. 134°–135°). [Found: C, 77.65; H, 7.75; N, 9.35%. C$_{19}$H$_{22}$N$_2$O requires C, 77.5; H, 7.5; N, 9.5%].

EXAMPLE 34

Capsules

| | |
|---|---|
| α,α-Diphenyl-(1,4,5,6-tetrahydro-2-pyrimidyl)-methanol | 20 mg. |
| Lactose | 108 mg. |
| Talc | 2 mg. |

Batches of the active ingredient and lactose are sieved through a 40 mesh (British Standard) screen and mixed together. Water is added until the mix acquires a suitable consistency for granulation and the wet mass is passed through a 16 mesh (British Standard) screen. The talc is sifted through a 40 mesh (British Standard) screen, added to dried granules and mixed. Hard gelatine capsules are then filled with the mixture.

EXAMPLE 35

Tablets

| | |
|---|---|
| α,α-Diphenyl(1,4,5,6-tetrahydro-2-pyrimidyl)-methanol | 20 mg. |
| Lactose | 100 mg. |
| Avicel (microcrystalline cellulose) | 20 mg. |
| Dried maize starch | 40 mg. |
| Magnesium stearate | 5 mg. |

Tablets of the above composition were made by milling the active ingredient to 40 mesh (British Standard), sieving through a 40 mesh (British Standard) sieve, mixing the milled material with the other components and compressing to form tablets.

What is claimed is:

1. A compound selected from the group consisting of bases having the formula

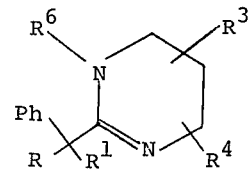

and the pharmaceutically acceptable acid addition salts thereof wherein R$^3$ and R$^4$ which may be the same or different each represent a member of the group consisting of hydrogen, lower alkyl and hydroxy with the proviso that when one of R$^3$ and R$^4$ is hydroxy, the other of R$^3$ and R$^4$ is hydrogen, Ph represents a phenyl group optionally monosubstituted by lower alkyl, lower alkoxy, or halogen, R is a member of the group consisting of hydroxyl, lower alkanoyloxy, lower alkoxy and halogen, R$^1$ is a member of the group consisting of phenyl, halophenyl, lower alkoxyphenyl, lower alkylphenyl di-(lower alkyl)phenyl and naphthyl and R$^6$ is a member of the group consisting of hydrogen, lower alkyl, and lower alkanoyl.

2. A compound according to claim 1 which is α,α-diphenyl(1,4,5,6-tetrahydro-2-pyrimidyl)methanol.

3. A compound according to claim 1 which is α-(2,6-dimethylphenyl)-α-phenyl-(1,4,5,6-tetrahydro-2-pyrimidyl)methanol.

4. A compound according to claim 1 which is 2-(chlorodiphenylmethyl)-1,4,5,6-tetrahydro-pyrimidine.

5. A compound according to claim 1 which is α,α-diphenyl(1,4,5,6-tetrahydro-5-hydroxy-2-pyrimidyl)-methanol.

* * * * *

UNITED STATES PATENT AND TRADEMARK OFFICE
CERTIFICATE OF CORRECTION

PATENT NO. : 3,926,994
DATED : December 16, 1975
INVENTOR(S) : Alan Chapman White and Robin Michael Black It is certified that error appears in the above-identified patent and that said Letters Patent are hereby corrected as shown below:

Title page, item 30, Foreign Priority Data should read:

| December 6, 1971 | United Kingdom | 56467/71 |
| December 14, 1971 | United Kingdom | 1250/71 |
| November 30, 1972 | United Kingdom | 11,199/72 |
| March 15, 1972 | United Kingdom | 12,069/72 |

Column 1, line 11, "compounds" is mis-spelled.

Column 2, line 16, "imidazolinyl" is mis-spelled.

Column 2, line 19, a hyphen has been omitted after "2".

Column 2, line 23, "21yl" should read "2-yl".

Column 5, line 52, an opening parenthesis should be added after "α-", first occurrence.

Column 9, line 14, a hyphen should be inserted after "2".

Column 9, line 64, a hyphen should be inserted after "α".

Column 10, Example 10's title line should start with an "α".

Column 12, Example 14's title should appear as:

α,α-Diphenyl-(1,4,5,6-tetrahydro-1-methyl-2-pyrimidyl) methanol hydrobromide

Column 15, line 9, "sample" is spelled incorrectly.

Signed and Sealed this

Fifteenth Day of February 1977

[SEAL]

Attest:

RUTH C. MASON
Attesting Officer

C. MARSHALL DANN
Commissioner of Patents and Trademarks